Aug. 2, 1966 J. J. ROUBAL 3,263,585
PHOTOGRAPHIC FILM APPARATUS
Original Filed Oct. 22, 1963 3 Sheets-Sheet 3

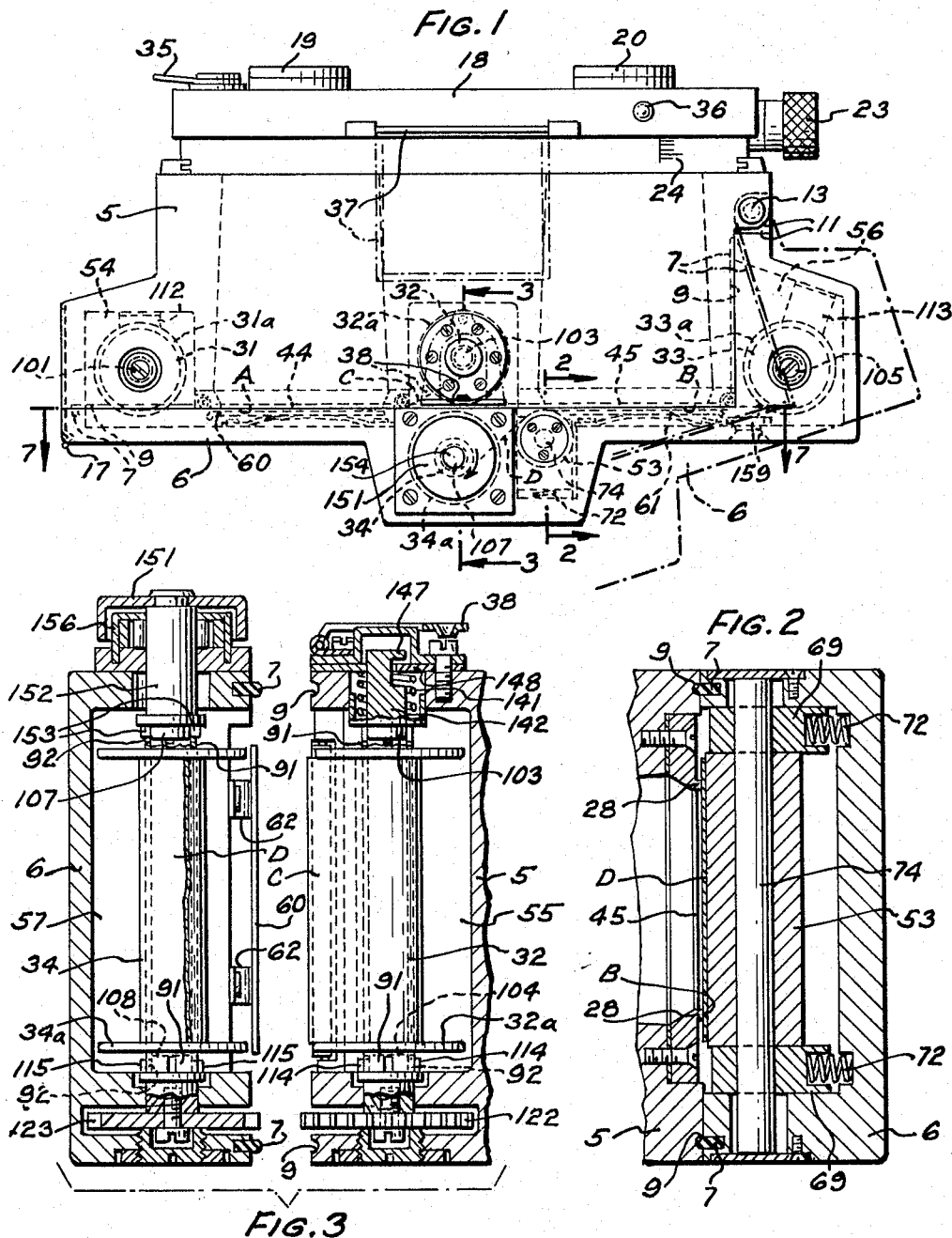

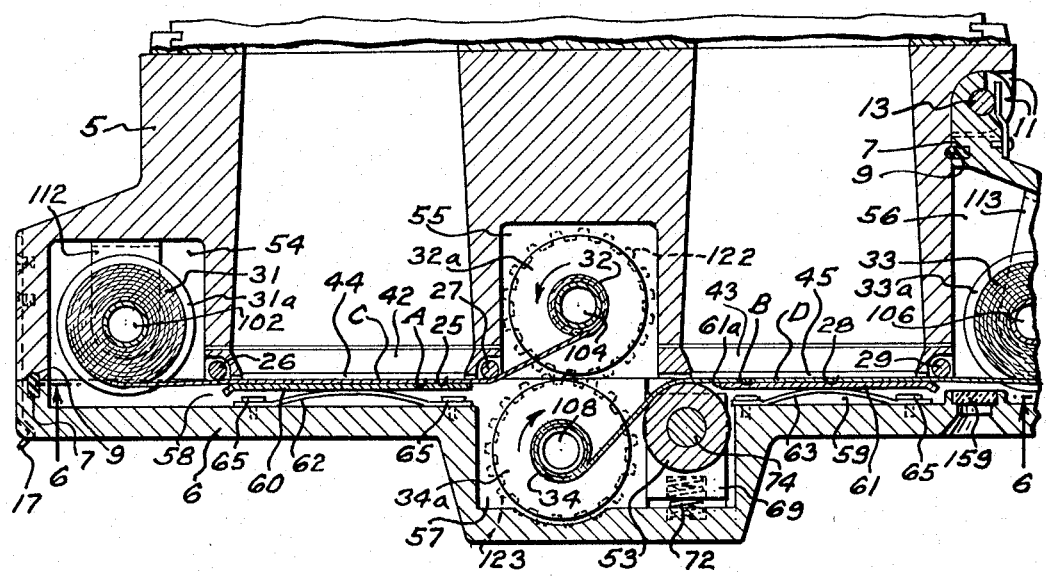
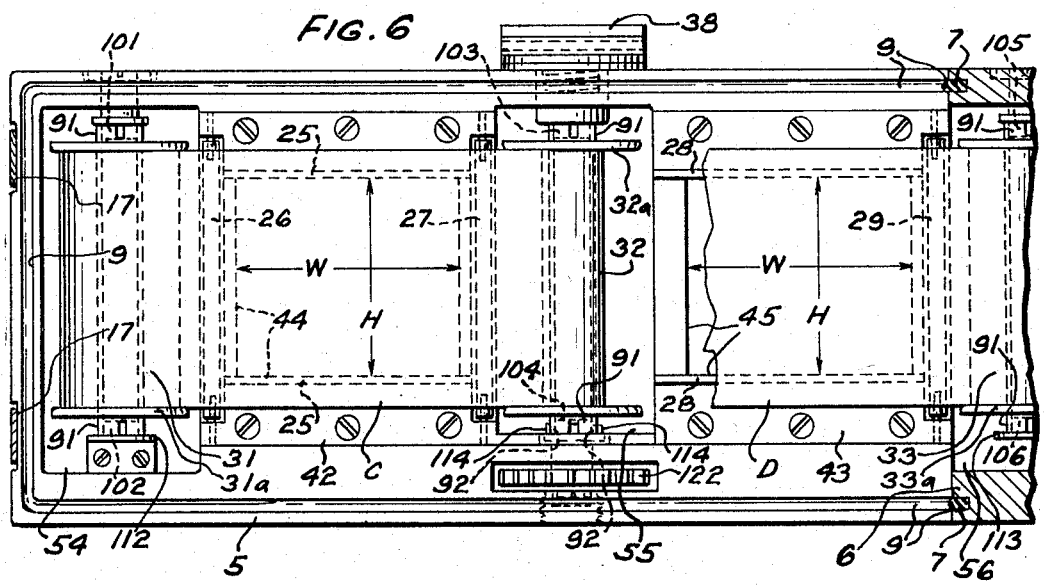
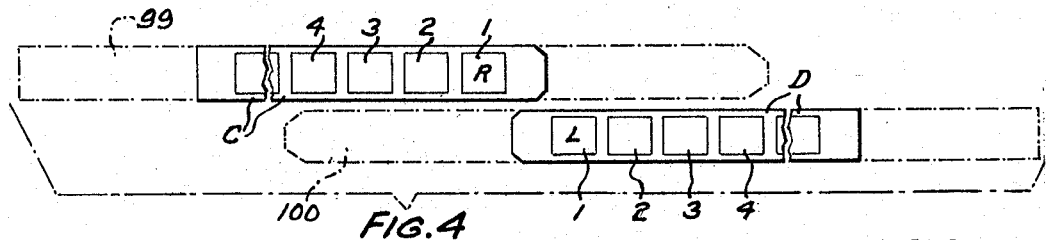

INVENTOR
Joseph J. Roubal

3,263,585
PHOTOGRAPHIC FILM APPARATUS
Joseph J. Roubal, 5135 W. 22nd Place, Cicero, Ill.
Continuation of application Ser. No. 318,776, Oct. 22, 1963. This application Feb. 8, 1965, Ser. No. 434,168
1 Claim. (Cl. 95—18)

This invention relates to stereo cameras and more particularly to apparatus and photographic films operating in a stereo camera to the end of photographing larger size stereo pictures in unblurred detail and accordingly reliably, and this application is a continuation of my co-pending application, Serial No. 318,776, filed October 22, 1963, now abandoned.

In photographing at the restricted stereo picture spacing of 2½ inches stereo pictures of a larger size and such being a composite of or constituted by corresponding larger size, right and left stereo complementary pictures, and in an improvised stereo camera to this end utilizing deviating rollers to deviate and thereby obtain roll supplied photographic films at the cameras' film locating surfaces and under the cameras' resilient presser plates, I became aware that in a delayed time winding and or taking up of the photographic films and therewith the accompanying delayed time stopping of the photographic films that such photographic films in the portions as immediately leave the supply rolls when bent and stopped on the deviating rollers and due therewith in the longer interval of time to atmospheric humidity in the camera affecting the photographic films in their constituting materials would in such portions form to contain set deformations and or warpages. In the stereo camera, resilient presser plates will normally urge the photographic films to locate flatly in the focal planes of the photographing objectives at the cameras' film locating surfaces. However, it will be seen that when set deformations and or warpages are contained by the photographic films, such photographic films totally resist flat location as is urged by the resilient presser plates with the consequence that these photographic films when exposed in the camera are photographed variously out of focus and because of this blurred detail is contained variously in the photographed successive right and left stereo complementary pictures.

It is the object of the invention to overcome and correct the foregoing and to this end in a stereo camera having photographing objectives at 2½ inches or equivalent stereo viewed picture spacing, apparatus is arranged for winding and taking up photographic films in takeup rolls thus by way of the inner ends of the stereo camera film locating surfaces and thereby the photographic films in equal lengths or in equal lengths are movable and stoppable at the stereo camera film locating surfaces and under the stereo camera resilient presser plates and which is with respect to the stereo camera picture defining apertures, and such being for photographing in the photographic films by the spaced photographing objectives through the picture defining apertures of stereo complementary pictures, and, a photographic film supply roll is arranged mounted forwardly of each of the opposite outer ends of the stereo camera film locating surfaces, and thereby the photographic films by uncoiling rearwardly are availably supplied to move directly to locate at the stereo camera film locating surfaces and under the stereo camera resilient presser plates.

It will be seen that, in the cooperation of the features above indicated, being in detail of structure, devices and arrangements as involved described in the specification, that, in any delayed time winding when in the constituting materials the photographic films are affected by atmospheric humidity that such photographic films will reliably flatly locate at the stereo camera film locating surfaces under the cameras' resilient presser plates, and which is in the focal planes of the stereo camera photographing objectives; and due thereto, and thus in any delayed time winding which involves the taking up of the photographic films, reliable and as such in focus and unblurred photographing is made possible of the successive stereo pictures in the right and left stereo complementary pictures and as are photographed in the photographic films in the arrangement successively evenly or thus substantially as to the advanced terminal ends of the photographic films.

As indicated, a photographing preferably of larger stereo pictures in the right and left stereo complementary pictures is set forth and to this end the invention permits the use of photographic roll films of the well known 35 mm. size—and without marginal perforations. And as concerns the foregoing, it is evident, a stereo camera, as constructed in accordance with the invention, at the photographing spacing of 2½ inches, obtains in a pair of photographic roll films, right and left stereo complementary pictures each of the width or length of 1¼ inches (approx. 32 mm.), and which is by comparison with stereo cameras known in the art which at an "equivalent" stereo photographing spacing (i.e. 2¾ inches) obtain in a single 35 mm. photographic roll film, right and left stereo complementary pictures each of the width or length of 23 mm. And which present stereo camera, due to the invention, further obtains, by not requiring the marginal perforations in the 35 mm. films, the stereo picture height of 27 mm., and which is by comparison with the known stereo cameras in the art, which relying on the marginal perforations for their operation, obtain in the single 35 mm. film the relatively lower stereo picture height of 24 mm.

The following objects and advantages are also noted due to the invention.

The right and left stereo complementary pictures as are photographed in the photographic films successively evenly or thus substantially provides an orderly arrangement of the successive stereo pictures, which facilitates locating as of a select stereo picture in the right and left specific complementary pictures as for inspection thereof and or when such are cut to therewith involve the usual reversing in connection with the assembly thereof into a frame for stereo viewing and or where such may be desired to be reproduced.

In the matter of the larger stereo picture contained in the 35 mm. films without marginal perforations, it is seen that thereby, photographic film material, in color being costly, is more advantageously and economically utilized.

A photographic film apparatus compact in form is provided thereby realizing a compact hand camera.

A film apparatus is provided which in the required light tight camera housing permits ready and convenient separability and accessibility thus in connection with the placement into the apparatus and or threading in loading and the removal therefrom of the photographic films and as such involves a pair of photographic film supply rolls and interconnecting take-up rolls.

In an alternate form of mechanism for taking up the photographic films, a reflex view finder is made available in the stereo camera to critically observe the actual detail as is photographed. It is noted, as is well known in the art, exposed for unwanted detail cannot be deleted or altered in a stereo picture, and to this end, a reflex view finder in the stereo camera readily indicates the presence of unwanted detail.

The foregoing and other objects of the invention will appear from a reading of the description in connection with the drawings, in which:

FIG. 1 is a plan view of a stereo camera illustrating the invention in one embodiment.

FIG. 2 is a section on line 2—2 of FIG. 1.

FIG. 3 is a section on line 3—3 of FIG. 1 and shows the nature of the open camera at this point.

FIG. 4 illustrates fragmentarily the pair of photographic roll films which in accordance with the invention is reliably photographed in successive stereo complementary pictures 1 and 1; 2 and 2; 3 and 3; etc.

FIG. 5 is a longitudinal horizontal section on a larger scale taken substantially centrally of the apparatus with the front of the camera and right end of the structure broken away.

FIG. 6 is a section on line 6—6 of FIG. 5.

Figure 7:
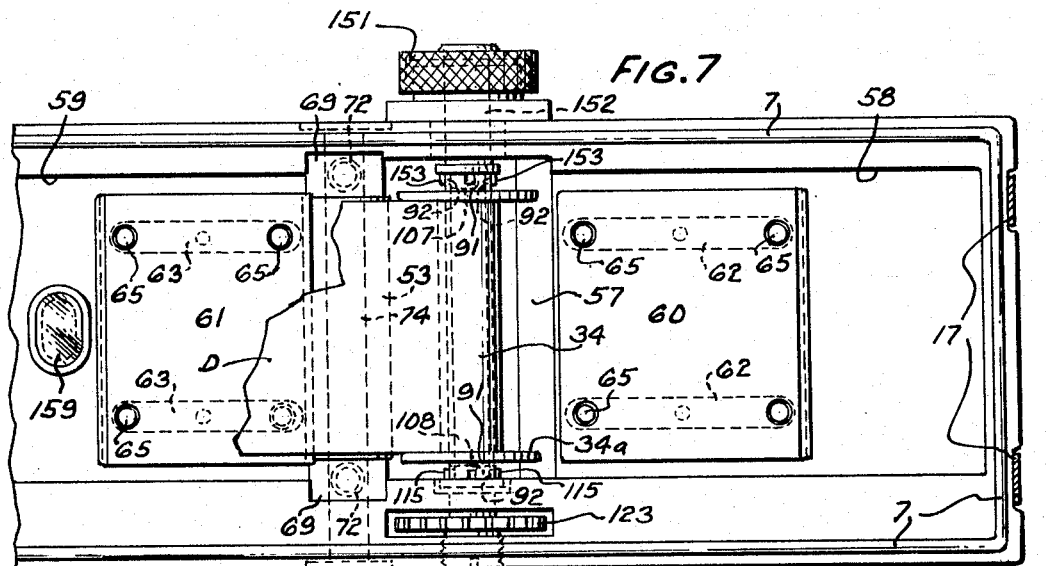

FIG. 7 is a section on line 7—7 of FIG. 1.

Figure 8:
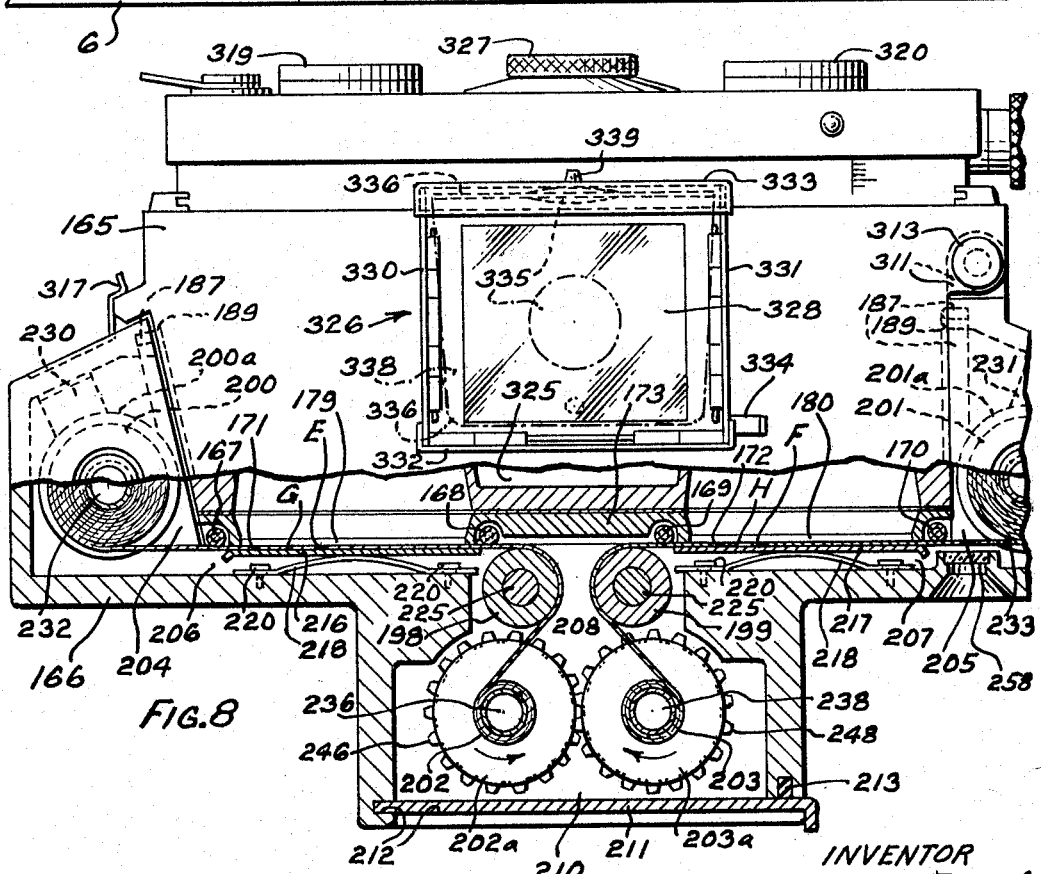

FIG. 8 is a plan view of a stereo camera fragmentarily broken out illustrating the invention and showing a reflex view finder construction as realized due to a modified mechanism for taking up the photographic films.

Referring to the drawings, the stereo camera has in a front 18, a suitable shutter mechanism arranged to make an exposure through photographing objectives at 19 and 20 thus when a lever 35 is set and thereupon a button 36 is depressed. In the erect position shown in FIG. 1, view finder members 37 and 38 serve to indicate when viewed therethrough the picture outline and view or scene to be photographed. A focusing of the objectives at the front 18 may be obtained by turning a knob 23, and the distance of photographing may be noted at 24.

It should be understood, the camera has for its purpose to photograph through the objectives at 19 and 20, right and left stereo complementary pictures at a spacing which is 2½ inches, as such, the average spacing at which the composite stereo picture may be viewed in a viewer device or stereoscope. However, greater visual depth may be obtained in a viewed stereo picture by the expedient of photographing the complementary pictures at 2¾ inches spacing and such modifications are contemplated. As further described, in association of the objectives at 19 and 20, picture place as the film C on the roller 27 by way of the inner end of the film locating surfaces A is taken up forwardly therewith to form a take-up roll 32.

In view of the description, it is seen, the rollers 27 and 53 determine the inner ends of the film locating surfaces A and B and provide thereby a central separation, as is shown. Considering this central separation, it is noted, that such is less than the space of 1¼ inches existing between the apertures 44 and 45 which, as is described, are of the width or length of 1¼ inches respectively. In view of this close spacing the roller 53 is arranged to deviate the film D rearwardly, as is described. In the arrangement, the roller 53 in the spring mounting, as has been described, is carried by a rear housing frame 6. A simplified access to the apparatus is obtained by means of the housing frame 6 as such cooperates with the housing frame 5, and this will appear as the description proceeds.

To the end that, at the film locating surfaces A and B in the focal planes of the objectives at 19 and 20 the films C and D are urged to be flatly located, resilient presser plates 60 and 61 are arranged. These plates have resilient springs 62 and 63, respectively, and by rivets 65 are held attached in grooves 58 and 59. Due to the presence of the roller 53 at the inner end of the rails, the plate 61 is shortened at 61a.

It is understood, the films C and D are preferably 35 mm. wide, and are availably supplied as is shown in FIG. 5 by photographic film supply rolls 31 and 33, respectively, carried in spools 31a and 33a. And, in accordance with the present invention, these films require no marginal perforations. While not shown in the drawings, it is understood, the films C and D are carried in the spools by the usual backing papers that protect the light sensitive films from light penetration when not in the camera, and which also protects the films during threading, when loaded into the camera. In the present instance, it is understood, the film D has the backing paper printed rearwise in stop designations "1," "2," "3," etc. (not shown) for visual observation in an opaque or red window 159 thereby to stop the films successively in the winding and the taking up thereof in the take-up rolls 32 and 34, as will more clearly be described.

In accordance with the invention, to the end that the photographic films C and D reliably flatly locate and in successive stereo pictures that such are reliably photographable at the rear facing film locating surfaces A and B and under the resilient presser plates 60 and 61, as is shown more especially in FIG. 5, there is provided, the mounting at the opposite outer ends and forwardly of the rear facing film locating surfaces A and B, of the film supply roll 31 in the spool 31a uncoiling rearwardly in the film C and of the film supply roll 33 in the spool 33a uncoiling rearwardly in the film D.

The mounting incorporates, top and bottom studs 101, 102 and 105, 106, which (FIG. 6) in a suitable construction, are arranged to mount the supply rolls in the spools, and in chambers 54 and 56 of the housing frames 5 and 6, respectively. It is understood, the studs permit a free rotation at axial ends 91, of the roll containing spools. Springs 112 and 113 carrying the bottom studs 102 and 106 serve to yield when placement is made thereon of the spooled rolls, and permit also a removal, as of the empty spools.

As is described, the photographic films C and D uncoil rearwardly from the supply rolls 31 and 33, respectively, as such are mounted forwardly of the opposite outer ends of the rear facing film locating surfaces A and B, and, in the winding and taking up these films, to be in greater detail described, the defining window apertures 44 and 45 are arranged at the 2½ inches spacing and therewith are arranged, as is shown, rear facing film locating surfaces A and B. At the rear facing film locating surfaces A and B, which are in the focal planes of the objectives at 19 and 20, photographic film C and D in form of a pair reliably flatly locate, in accordance with the invention, as will more clearly be described. And it should be seen, as photographed by the objectives through the window apertures 44 and 45, in the dimensions (FIG. 6) designated W, W, each of which is a width, or length of 1¼ inches (approx. 32 mm.), and H, H, each of which is a height of 1 1/16 inches (27 mm.), that stereo complementary right and left pictures having corresponding dimensions will be photographed in the films C and D at the film locating surfaces A and B.

Describing the construction further, it is seen, the apertures 44 and 45 are formed in plates 42 and 43 which are attached suitably rearwise of a housing frame 5. Rails 25, 25 and 28, 28 are also formed in the plates 42 and 43. Also in the plates are rollers 26, 27 and 29 mounted suitably endwise for free rotation. The rails and rollers 25, 25, 26, 27 and 28, 28, 29, as is shown, form the film locating surfaces A and B. In the arrangement, the rollers 26, 27 and 29 transversely support and allow a frictionless movement thereon of the films.

Attention is directed to a roller 53 which is rotatable freely on a shaft 74 carried by end blocks 69, 69 and moves urged by springs 72, 72 in the direction of the rails 28, 28. As is shown, the roller 53 transversely supports the film D at the inner end of the film locating surfaces B, and has in this purpose, the deviating of this film D rearwardly as this film D is taken up by way of the mentioned inner end of the film locating surfaces B therewith to form in a take-up roll 34. It is noted, this takes films C and D in the portions as immediately leave the supply rolls will move, as is shown in FIG. 5, directly to locate at the rear facing film locating surfaces A and B, and since that thereby no bending as by deviating of the films is involved and notwithstanding that in the camera atmospheric humidity at all times affects the films in their constituting materials, it will be seen, these films C and D will move at the rear facing film locating surfaces A and B to locate reliably flatly under the resilient presser plates 60 and 61, respectively.

In view of the reliable flat locating of the photographic films C and D realized at the cameras' rear facing film locating surfaces and under the cameras' resilient presser plates, and which, as is described, is obtained at the window apertures 44 and 45 in the focal planes of the photographing objectives at 19 and 20, it should be seen, that reliable photographing in the films C and D of stereo pictures (see FIG. 4) as are constituted by right (R) and left (L) stereo complementary pictures will take place, it is understood, as such involves any delayed time winding and taking up of the films in the take-up rolls 32 and 34, and wherein such films are successively stopped, in the present instance, in accordance with the stop designations "1," "2," "3," etc. (not shown), when viewed in the window 159.

As concerns the foregoing, the following is further noted. Accordingly, in normal use of the stereo camera wherein the films C and D in the constituting right and left stereo complementary pictures are to be photographed, or have been photographed, and this procedure entails a delayed time stopping which thereby in the camera subjects the films to atmospheric humidity thereupon, in the delayed time winding and taking up of the films, these films, in the successive constituting right and left stereo complementary pictures, when exposed therefor, will be reliably photographed and as such flatly in focus and in unblurred detail and of course when the camera is properly focused for the purpose.

Considering the mechanism for taking up the films C and D in the take-up rolls 32 and 34, it will be seen in the description, that such is operable by winding and involves arrangements realizing a taking up of the films in unison and this obtains, as is shown by FIG. 4, that the right (R) and left (L) stereo complementary pictures 1 and 1; 2 and 2; 3 and 3; 4 and 4; etc., appear arranged when photographed, successively evenly or thus substantially as to the advanced terminal ends of the films C and D. As is seen, by the operation of the take-up mechanism the films C and D are movable at the rear facing film locating surfaces oppositely in a direction of one another and such takes place, as is indicated by arrows in FIG. 5, as the take-up rolls 32 and 34 take up the films in opposite directions.

Now describing the construction, it is seen, a gear wheel 122 is mounted rotatably to provide a stud 104 in a chamber 55 of the frame 5. And a gear wheel 123 is mounted rotatably to provide a stud 108 in a chamber 57 of the frame 6. The studs 104 and 108 mount bottom wise the film take-up spools 32a and 34a as carry the film take-up rolls 32 and 34, respectively, and locate these, as indicated hereinbefore, thus forwardly and rearwardly as to the inner ends of the film locating surfaces A and B. The roll spools 32a and 34a are of the same construction as the supply roll film spools, hereinbefore described, and when empty may be those removed from the chambers 54 and 56. As common, these roll spools have in the bottom ends, end slots 92 and thereby are in removable engagement of projections 114 and 115 of the studs 104 and 108.

It is understood, in this removable engagement and mounting the roll spools 32a and 34a are in positive driving of the wheels 122 and 123 and since, as is shown, these wheels have equal number of tooth elements, that unison of rotation is thereby realized for the spools 32a and 34a to form therein the take-up rolls 32 and 34. In this arrangement and by initially starting, as will more clearly appear, the coiling and the forming of the rolls 32 and 34 in equal lengths of the films, the films C and D are taken up equally or thus substantially as to the advanced terminal ends thereof.

Arranged to mount the roll take-up spools 32a and 34a at their top axial ends 91 are studs 103 and 107 which locate the spools at the top sides of the chambers 55 and 57. At the stud 103, the take-up spool 32a is free to rotate. However, this stud is axially movable in a short shaft 142 and spring 141 which permits the spool 32a to be either placed on the studs 104 and 103 or to be removed therefrom as when the take-up roll 32 is fully formed. A mounting including a lip 147 stopped by a plate 148 retains the stud at its top location when no spool or roll mounts on the studs. At the top of the chamber 57, a direct driving is arranged for the stud 107 drivingly engaging the roll take-up spool 34a by projections 153 entered in the spool end slot 92. This direct driving is by means of an elongated shaft 152 passing through a uni-directional clutch 156 for movement clockwise, as is indicated, and which in this direction is rotatable by a winder knob 151. It should be seen, further, that by means of the winder knob 151 drawn axially upwardly, that the spool 34a, as when the take-up roll 34 is fully formed, may be removed from the studs 107 and 108, and also as upon locating of the empty spool thereat, that in a movement axially downwardly, the stud 107 will engage this spool for a driving thereof, as is described.

As hereinbefore mentioned, the housing frames 5 and 6 provide access to the apparatus thus necessary in connection with the loading in the camera of the films. To this end, the chambers 54 and 55 for the operation of the film C open rearwardly of the frame 5, and the chambers 56 and 57 for the operation of the film D open forwardly of the frame 6. A groove and resilient element 9 and 7 at the marginal edges at the planes of separability between the housing frames 5 and 6, as is shown, obtain for a light tight separable closure between these frames.

A latching arrangement also is provided and this may include latching springs 17 and a hinge and latch pin 11 and 13 operating at the opposite end sides of the closed frames. It is understood that for the opening of the camera, the closed frames 5 and 6 (FIGS. 1 and 5) may be delatched at the springs 17 whereupon the rear frame 6 will swing open on the hinge and latch pin 13 as into the position indicated fragmentarily in dash outline in FIG. 1. An axial withdrawal of the pin 13 will permit, it should be seen, complete separability of the frames 5 and 6. To realize in a facile manner a closing of the housing, it will be seen, the frame 6 in the first instance may be readily attached at the hinge 11 by the pin 13 whereupon the frame 6 will swing conveniently hingedly for its closing at the frame 5 to be latched at the latch springs 17, as is described.

It is seen that in the separability of the frames, in the present form shown in FIG. 3, the wheels 122 and 123 are free of one another. A closing of the frames reestablishes the normal engagement of the wheels as is shown in FIG. 5.

Loading of the films will now be described. This permits when the camera is open, and to this end, fully coiled unexposed supply rolls 31 and 33 in the spools 31a and 33a are placed on the mounting studs 101, 102 and 105, 106 in the chambers 54 and 56, respectively. Therewith the film C of the roll 31 in the advanced terminal end of the backing paper is drawn out a length, and this terminal end is attached, as by a slot (not shown), to the arbor of the take-up spool 32a; and as such which may be at once a noted number of turns of this take-up spool 32a are made in the counter-clockwise direction, as is indicated, thereby to initially coil and form the take-up roll 32. The same type of considered manipulation may be repeated for the film D of the roll 33, and similarly this film in the advanced termined end of the backing paper is drawn out a length, and the terminal end thereof is attached, as by a slot (not shown), to the arbor of the take-up spool 34a, and as such which may be at once a noted number of turns of this take-up spool 34a are made in the clockwise direction, as is indicated, thereby to initially coil and form the take-up roll 34. It is understood that as concerns the matter of noting the number of turns made initially to coil and form the take-up rolls 32 and 34, that these are equal or thus substantially in order that the films C and D correspondingly move in equal lengths or thus substantially in the matter of the attached advanced terminal ends thereof. It will be noted that the proper direction required to initially form the take-up rolls is at once facilitated by observing the black sides of the backing papers.

Assuming now that proper placement, threading and loading of the films in connection with the supply rolls and that of the initial starting and forming of the take-up rolls is brought about, and that therewith a closing of the camera is obtained in the manner as is shown in FIG. 5, it will be seen, the apparatus is in normal operating condition for taking up and winding of the films. To effect this, as indicated in FIG. 1, the turning of the winder knob 151 unidirectionally and clockwise will produce a rotation of the take-up roll 34 which therewith due to the spool 34a and spool 32a, as is described, stud bottom engaged connections and therewith, inter-connection of the wheels 122 and 123 will produce a unison of taking up and winding thus in opposite directions indicated in FIG. 5 of the take-up rolls 32 and 34.

Again assuming, as is described, that this taking up of the films in continued, it will be seen, in further rotative winding by the winder knob 151, that therewith at the window 159, as has been described (not shown) the designation "1" in the backing paper of the film D will appear at which stopping is at once made by the winder 151 in further winding here of the films. An exposure and photographing by the camera for the first stereo picture may therewith be undertaken, and it will be seen, as photographed, this first stereo picture will appear in the films C and D, as the pictures, designated in FIG. 4, as 1 and 1; and such being designated R and L, respectively, or right and left stereo complementary pictures; and which pictures will be arranged in the films C and D evenly or thus substantially as to the advanced terminal ends of these films.

And it will be seen that thereupon, in a successive taking up of the films C and D by winding in the turning of the winder 151, as is described, and wherein at the window 159 are observed the designations "2"; "3"; "4"; etc. (hereinbefore described, not shown), and as concerns such designations whereby a succesive stopping and therewith a photographing in the films of successive stereo pictures is made, that this will obtain, as is shown to this end in FIG. 4, a photographed arrangement of successive right and left stereo complementary pictures 2 and 2; 3 and 3; 4 and 4; etc., and such will appear arranged photographed successively evenly or thus substantially as to the advanced terminal ends of these films.

In view of the description, and shown in FIG. 4, it is understood, that the right complementary pictures appear photographed in the film C, and the left complementary pictures appear photographed in the film D. Also it is noted in FIG. 4, the dashed outlines 99 and 100 represent the backing papers as such constitute the films C and D, respectively, and which of course are discarded in the processing of these films.

In the modified form shown in FIG. 8, in a manner described hereinbefore, and which more clearly will appear, films G and H in form of a pair reliably flatly locate at rear facing film locating surfaces E and F under resilient presser plates 216 and 217, respectively. And due thereto when an exposure is made through the stereo camera objectives at 319 and 320, and such being in the focal planes thereof, these films G and H are reliably photographable more especially in larger successive stereo pictures constituted by respective larger successive right and left stereo complementary pictures. As is shown, the resilient presser plates are carried by springs 218 and 218 attached by rivets 202 and 202 in grooves 206 and 207 of a rear housing frame 160.

As hereinbefore described, the films G and H, in a central separation which is less than 1¼ inches, are taken up by way of the inner ends of the film locating surfaces E and F. In the present construction, however, rollers 198 and 199 as are freely rotatable on shafts 225 and 225 here thus operate to deviate the films G and H rearwardly as therewith, as is shown, in the taking up of the films rearwardly take-up rolls 202 and 203 are formed in take-up spools 202a and 203a, respectively.

Considering the mechanisms for taking up the films, it is seen, bottom wise mounting the spools 202a and 203a are studs 236 and 238, respectively, and it should be understood, in a manner as has been described hereinbefore, these studs 236 and 238 have projections engaging slotted bottom axial ends (not shown) of the spools 202a and 203a and by means of which these spools are in removable engagement and in positive driving engagement thereof. Also, in a manner, as has been described, a unison of movement is obtained between the studs 236 and 238 and therewith between the take-up rolls 202 and 203 in the spools 202a and 203a, and this is realized by gear wheels 246 and 248 which being arranged to provide the studs, interengage in like number of toothed elements, as is shown. For operation the wheels 246 and 248 are suitably rotatably journallel at the bottom side of a rear chamber 210 formed in the rear housing frame 166.

It should be understood, while not shown in FIG. 8, that at the top side of the chamber 210, the spool 202a is mounted for free rotation and the spool 203a is mounted drivingly engaged on studs, in a manner, as described hereinbefore, and which in a direct driving of the spool 203a in the clockwise direction, as is indicated, may incorporate a uni-directional clutch and a winder knob as of the type 151, hereinbefore described.

By means of the above, and, as will be described, the attachment to the arbors of the take-up spool 202a and 203a of the film G and H at their advanced terminal ends; and wherein these films move in a direction of one another at the rear facing film locating surfaces E and F; and in equal lengths or thus substantially as such are initially started to coil and form the take-up rolls 202 and 203, it will be seen, that, the films G and H will be taken up equally or thus substantially as concerns a successive stopping to photograph the successive stereo pictures and in the successive taking up of the films.

It is understood the films constitute and are carried by backing papers (not shown), as hereinbefore desired, and stop designations "1," "2," "3," etc. (also not shown), are arranged here for the film H to be viewed at an opaque or red window 258; and when photographed by the objectives at 319 and 320, the right and left stereo complementary pictures will appear arranged in the films G and H similarly, as is shown in FIG. 4, as the successive pictures 1 and 1; 2 and 2; 3 and 3; etc.; and such, it is understood, will appear arranged successively evenly or thus substantially as to the advanced terminal ends of these films; and it is understood, in photographing the successive stereo pictures, such will be realized in the taking up successively and therewith involved stopping of the films, in the present instance, as based on viewing at the window 258 of the stop designations "1," "2," "3," etc.

In the housing the spooled take-up rolls 202 and 203 are accessible on the mounting studs in the rear chamber 210 which opens, as is shown. A gate 211 sliding in ways 212 and contacted by a light sealing element 213 obtains a light tight openable closure. It is seen, in the present instance, that without opening the camera which would require separability of the rear frame 166 from the camera frame 165 that ready access may be made to the chamber 210, as for example, upon exposing the films, to remove the fully formed take-up spooled rolls 202 and 203.

Considering further the film locating surfaces E and F, similarly as described hereinbefore, to this end there are arranged, rails and rollers, and in FIG. 8 such are indicated by 171, 167, 168 and 172, 169, 170. A plate 173 attached suitably rearwise of the frame 165 constitutes the rails and rollers. Also provided by the plate are the picture defining window apertures 179 and 180. It should be understood that the apertures each in the dimensions of width or length of 1¼ inches (approx. 32 mm.) and of height of 1 1/16 inches (27 mm.) similarly, as described hereinbefore, when photographed therethrough and thus at the stereo spacing of 2½ inches will obtain in the films G and H the right (R) and left (L) stereo complementary pictures having the corresponding dimensions, respectively.

In the present described form, the films G and H are availably supplied by rearwardly uncoiling film supply rolls 200 and 201 in spools 200a and 201a, respectively, and in the same manner, as hereinbefore described, the films in rearwardly uncoiling move directly to locate at the rear facing film locating surfaces E and F and thereby to locate reliably flatly under the resilient presser plates 216 and 217, respectively.

To realize the above there is provided, as hereinbefore, at the opposite outer ends and forwardly of the rear facing film locating surfaces E and F, a mounting of the film supply roll 200 in the spool 200a thus uncoiling rearwardly in the film G and of the film supply roll 201 in the spool 201a thus uncoiling rearwardly in the film H. It is understood, top and bottom studs, in the instant form, also mount the spooled film supply rolls, and as is shown, for the bottom studs 232 and 233 these have springs 230 and 231 to yield for placement of the unexposed rolls or the removal as of the empty spools.

It is seen that in the present form, the mounted film supply rolls at the opposite outer ends and forwardly of the film locating surfaces, as described, are housed for operation in chambers 204 and 205 formed in the frame 166. Accessibility to the chambers is realized when the frame 166 is separated from the frame 165, which it is understood, takes place in substantially the same manner, as that of the housing construction, hereinbefore described.

A groove and resilient element 189 and 187 at the marginal edges at the planes of separability of the frames, also in the present instance, provides for a separate light tight closure therebetween. Also provided for, is the latching of the frames which includes a latching spring 317 and a hinge and latch pin 311 and 313. The opening of the frames may be obtained by delatching the spring 317 whereupon the rear frame 166 will hingedly swing open. A removal of the pin 313 will obtain a complete separability of the frames. This opening of the frames is of the same kind as previously described, and the closing thereof is similarly obtained.

As has been described, the chambers 204 and 205 are accessible in the rear frame 166, it being noted, forwardly at the side planes of the separability, and taking place when free from the frame 165. And assuming that this separability is made for the purpose of loading the films, it will be seen, that the unexposed spooled supply rolls 200 and 201 may readily be placed on the mounting studs in the chambers 204 and 205, and therewith the backing papers of the films G and H in the terminal ends of suitable length will permit insertion in opposite directions over the rollers 198 and 199 and thus therebetween at a central space 208. And it will be seen, thereby these films in respective lengths and terminal ends will project into the chamber 210.

Now remembering, the frame 166 is free of the frame 165, in one manner of proceeding herefrom, it should be understood, that a closing and latching of the frames, in the manner as is described, by means of the hinge pin 313 and latch spring 317 may be undertaken whereby the frame 166 will be attached as is shown in FIG. 8. Now further remembering in the loading here described, that the films in lengths thereof are projecting into the chamber 210, it will be seen, that with the removal of the cover 211 these films in their terminal lengths will be available and thereby may be further drawn out as may be required. Therewith, it will be seen, that for the purpose empty spools 202a and 203a are placed on the mounting studs in the chamber 210. As further drawn out, it should be understood, the films in the lengths as to their terminal ends are evened up to arrange such evenly or thus substantially—and therewith, the terminal ends of the evened up lengths are attached in a suitable manner (not shown) to the arbors of the take-up spools 200a and 201a, respectively. Thereupon, it will be seen, in the unison of movement obtained between the take-up spools 200a and 201a, as is described, and obtained by a turning of the winder knob (not shown) that such will initially coil and form the take-up rolls 200 and 201, taking place in equal number of turns or thus substantially, and such when stopped, and thereupon the cover 211 is replaced to close the chamber 210, it will be seen, concludes the loading of the films, and therewith the apparatus is in normal operating condition for taking up the films, as is shown in FIG. 8. In the matter of photographing of the successive stereo pictures here based on viewing the successive stop designations "1," "2," "3," etc., in the film H at the window 258, it is believed, such appears clearly in view of the embodiment, as is described hereinbefore.

The following is noted. Since in the present form, the films G and H, in the central space separation, are taken up by way of the inner ends of the film locating surfaces E and F thus rearwardly in the take-up rolls 202 and 203, this aspect in the stereo camera obtains for an available space and incorporated opening 325 in the frame 165 thus situated centrally and forwardly of the film locating surfaces, as is shown, and permits provision thereat of a reflex view finder 326. The finder 326 is of well known construction having an angularly disposed mirror (not shown) to pick up an image picture passing through a finder objective at 327, and operating so that the image picture is observed visually at a ground glass 328. In effect, due to the association of the finder objective at 327 with that of the taking objectives at 319 and 320, the picture image observed at the glass 328, is the stereo picture photographed through the taking objectives thus as this concerns the very defining edges thereof. Hinged folding plates 330, 331, 332, and a hinged cover 333 from their vertical positions, shown in FIG. 8, are adapted to fold, lapping horizontally (not shown), and when so folded are suitably latched to hold this closed position as by a trip 334. The trip 334 when depressed inwardly, releases the closed hold, and by suitable springs, not shown, the plates and cover swing upwardly into their vertical position, as is shown.

A magnifier 335 provided by a hinged plate 336 and actuated by a spring (not shown) will swing into the horizontal position, indicated at 338, thus when a latch button 339 is depressed. In the position 338 the magnifier is used to more critically observe the picture at the glass 328 thus by magnification.

Modifications may be resorted to without departing from the spirit of the invention or the scope of the appended claim, which is not limited to the specific construction shown.

What is claimed is:

In a stereo camera having photographing objectives at 2½ inches or equivalent stereo viewed picture spacing and having in conjunction with stereo picture defining apertures rear-facing film-locating surfaces in the focal planes of said photographing objectives and having resilient presser plate means to urge photographic films to locate flatly at said rear facing film-locating surfaces, photographic films locating at said rear-facing film-locating surfaces, take-up means operable by winding for taking up the photographic films in take-up rolls by way of the inner ends of said rear-facing film-locating surfaces, said photographic films at their advanced terminal ends by attachment in said take-up means being coilable in the winding of said take-up means to form said take-up rolls, and said photographic films in equal lengths or substantially in equal lengths in the winding of said take-up means being movable and stoppable at said rear-facing film-locating surfaces with respect to said picture defining apertures to the end wherein in photographing by said photographing objectives and the therewith required winding of said take-up means, stereo complementary pictures will appear photographed in said photographic films successively evenly or thus substantially as to the films' advanced terminal ends, and means mounted photographic film supply rolls positioned forwardly of each of the opposite outer ends of said rear-facing film-locating surfaces and whereby said photographic films are availably supplied thus by uncoiling rearwardly and thereby to move directly to locate at said rear facing film-locating surfaces under said resilient presser plate means and whereby reliable flat location of said photographic films at said rear-facing film-locating surfaces and under said resilient presser plate means and thus in the focal planes of said photographing objectives takes place and is obtained thus in photographing with the camera requiring the winding of said take-up means upon any involved delayed time during which in the camera said photographic films are affected by atmospheric humidity.

References Cited by the Examiner
UNITED STATES PATENTS

| | | | |
|---|---|---|---|
| 586,097 | 7/1897 | Jeffery | 95—15 |
| 2,068,410 | 1/1937 | Hanke | 95—15 |
| 2,395,590 | 2/1946 | Simmon | 352—228 X |

JOHN M. HORAN, *Primary Examiner.*

UNITED STATES PATENT OFFICE
CERTIFICATE OF CORRECTION

Patent No. 3,263,585                                         August 2, 1966

Joseph J. Roubal

It is hereby certified that error appears in the above numbered patent requiring correction and that the said Letters Patent should read as corrected below.

Column 1, line 53, after "or" insert -- substantially --; column 4, line 38, beginning with "defining window" strike out all to and including "this takes" in line 72, same column 4, and insert the same after "picture" in line 43, column 3.

Signed and sealed this 1st day of August 1967.

(SEAL)
Attest:

Edward M. Fletcher, Jr.

Attesting Officer

EDWARD J. BRENNER

Commissioner of Patents